(12) United States Patent
Hanko et al.

(10) Patent No.: US 11,467,119 B2
(45) Date of Patent: Oct. 11, 2022

(54) ION-SELECTIVE ELECTRODE AND ELECTROCHEMICAL SENSOR

(71) Applicant: Endress+Hauser Conducta GmbH+Co. KG, Gerlingen (DE)

(72) Inventors: Michael Hanko, Dresden (DE); Thomas Wilhelm, Chemnitz (DE); Matthäus Speck, Göpfersdorf (DE); Lothar Auerswald, Döbeln (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 140 days.

(21) Appl. No.: 16/901,844

(22) Filed: Jun. 15, 2020

(65) Prior Publication Data
US 2020/0393403 A1 Dec. 17, 2020

(30) Foreign Application Priority Data

Jun. 14, 2019 (DE) ...................... 10 2019 116 288.2

(51) Int. Cl.
*G01N 27/333* (2006.01)
*G01N 27/30* (2006.01)
*G01N 27/406* (2006.01)

(52) U.S. Cl.
CPC ....... *G01N 27/3335* (2013.01); *G01N 27/301* (2013.01); *G01N 27/4062* (2013.01)

(58) Field of Classification Search
CPC ........... G01N 27/4062; G01N 27/4166; G01N 27/4167; G01N 27/301; G01N 27/302;
(Continued)

(56) References Cited

U.S. PATENT DOCUMENTS

| 4,859,107 A | 8/1989 | Box et al. |
| 6,398,931 B1 * | 6/2002 | Burchette .......... G01N 27/4035 204/417 |

(Continued)

FOREIGN PATENT DOCUMENTS

| DE | 02133419 | 11/1972 |
| DE | 2432167 | 1/1976 |

(Continued)

OTHER PUBLICATIONS

Deutsches Institut Fur Gutesicherung und Gutesicherung und Kennzeichnung E.V., RAL-Registrierung, Jul. 2007.
(Continued)

*Primary Examiner* — Gurpreet Kaur
(74) *Attorney, Agent, or Firm* — Kelly J. Smith; Endress+Hauser (USA) Holding Inc.

(57) ABSTRACT

The present disclosure relates to an ion-selective electrode for an electrochemical sensor for determining a measurand representing a concentration of an analyte in a measuring medium, including a probe body made of a first material and a sensor element including a base body made of a second material different from the first material and an ion-selective layer arranged on the base body. The probe body is connected to the base body by way of a liquid-tight joint, where the joint is formed by a receptacle, serving as a first joining partner, and a joining section protruding into the receptacle, serving as a second joining partner.

15 Claims, 4 Drawing Sheets

(58) Field of Classification Search
CPC ............ G01N 27/333; G01N 27/3335; G01N 27/416; G01N 27/4117; G01N 27/4035
See application file for complete search history.

(56) References Cited

U.S. PATENT DOCUMENTS

| | | | | |
|---|---|---|---|---|
| 2010/0116646 A1* | 5/2010 | Hanzalova | ......... | A61B 5/14539 427/523 |
| 2011/0273165 A1* | 11/2011 | Palassis | ................ | G01D 11/00 324/149 |
| 2015/0068891 A1* | 3/2015 | Fanselow | ............... | G01N 27/07 156/89.16 |
| 2017/0184499 A1* | 6/2017 | Höhne | ................. | G01N 21/643 |

FOREIGN PATENT DOCUMENTS

| | | |
|---|---|---|
| DE | 2721939 | 11/1978 |
| DE | 028455751 | 4/1979 |
| DE | 03134760 | 9/1982 |
| DE | 3240239 | 5/1983 |
| DE | 102004027831 | 3/2006 |
| DE | 102007004895 | 8/2008 |
| FR | 2911942 | 8/2008 |
| JP | 57037255 | 3/1882 |
| JP | 2016001163 | 1/2016 |
| JP | 2016085098 | 5/2016 |
| WO | 8303004 | 9/1983 |

OTHER PUBLICATIONS

Werner, Wolfgang, Klebgerechtes Konstruieren, konstruktios praxis, May 10, 2015.
Wittel, Herbert et al., Roloff/Matek Maschinenelemente, Springer Vieweg, 2017.
Matting, Alexander, Metallkleben, Springer-Verlag, 1969.
Habenicht, Gerd, Kleben—erfolgreich und fehlerfrei, Springer Verlag, 2016.
Ettemeyer, Prof Andreas, Konstruktionselemente, Kapitel 4:Kleben, May 2, 2010.
http://web.archive.org/web/20170908160415/http://www.konstruktionsatlas.de.

* cited by examiner

ION-SELECTIVE ELECTRODE AND ELECTROCHEMICAL SENSOR

CROSS-REFERENCE TO RELATED APPLICATION

The present application is related to and claims the priority benefit of German Patent Application No. 10 2019 116 288.2, filed on Jun. 14, 2019, the entire contents of which are incorporated herein by reference.

TECHNICAL FIELD

The present disclosure relates to an ion-selective electrode for an electrochemical sensor for determining a measurand representing an analyte concentration in a measuring medium, and to an electrochemical sensor.

Electrochemical sensors are used for the analysis of measuring media, such as, measuring liquids, in laboratory and process metrology in many fields of chemistry, biochemistry, pharmacy, biotechnology, food technology, water management, and environmental metrology. Using electrochemical processes, measurands representing ion concentrations, such as, for example, ion activities, ion concentrations or the pH value in liquids, can be detected. The substance the activity or concentration of which is to be measured is also referred to as an analyte. The measuring medium can be a measuring liquid such as an aqueous solution, emulsion, or suspension.

In general, potentiometric sensors comprise a measuring half-cell and a reference half-cell, as well as a sensor circuit, which is used to detect and process measured values. The measuring and reference half-cells can be combined in a measuring probe that can be immersed in the measuring liquid. This measuring probe can additionally comprise the sensor circuit or at least a portion of the sensor circuit. Via a cable or wirelessly, the measuring probe can be connected to a higher-level unit, for example a measuring transducer, an electronic operating device, a computer or a controller, for communication. The higher-level unit can be used for further processing of the measurement signals or measured values detected by means of the probe and for operating the measuring probe.

In contact with the measuring medium, the measuring half-cell forms an electrochemical potential that is dependent on the activity of the analyte in the measuring medium, whereas the reference half-cell provides a stable electrochemical reference potential that is largely independent of the analyte concentration. The sensor circuit generates an analog or digital measurement signal, which represents the electrical potential difference between the measuring half-cell and the reference half-cell and, consequently, the activity of the analyte in the measuring medium. The measurement signal is output by the sensor circuit, if necessary, to the higher-level unit, which further processes the measurement signal. Partial or complete further processing of the measurement signal in the sensor circuit in the measuring probe is also possible.

The reference half-cell is often configured as a second-type electrode, for example as a silver/silver chloride reference electrode, and is connected to the measurement circuit in an electrically conducting manner. It can comprise a housing and a reference element arranged in the housing, for example a silver wire coated with silver chloride, which is in electrolytically conducting or ion-conducting contact with the measuring liquid during the measuring operation by way of a reference electrolyte contained in the housing and an electrochemical transport, for example a diaphragm.

The measuring half-cell comprises a potential-forming sensor element, which can comprise an ion-selective membrane or layer, depending upon the type of the potentiometric probe. Examples of such measuring half-cells are ion-selective electrodes, which are used to detect measured values representing the concentration or the activity of ions in a measuring solution. A traditional ion-selective electrode has a housing that is closed by the ion-selective membrane and accommodates an inner electrolyte that is in contact with the membrane. The ion-selective electrode also comprises a terminal lead which is in contact with the inner electrolyte. The lead is connected to the sensor circuit in an electrically conducting manner. If the ion-selective membrane, for measuring, is in contact with the measuring liquid, the membrane substantially selectively interacts with a certain ionic species present in the measuring liquid, namely with the analyte. Changing the activity or concentration of the ion in the measuring liquid causes a relative change in the equilibrium galvanic voltage between the measuring medium and the terminal lead in contact with the ion-selective membrane via the inner electrolyte. A special case of such an ion-selective electrode, namely an electrode that selectively detects the hydronium ion activity in a measuring liquid, is the known pH glass electrode, which comprises a glass membrane as the potential-forming sensor element. The term ion-selective layer, membrane or electrode used here and hereafter denotes an ion-sensitive layer, membrane or electrode, the potential of which is preferably predominantly influenced by the analyte, for example a specific ion type or the pH value, wherein cross sensitivities of the layer, membrane or electrode for other types of ions are not precluded, but are preferably low.

Other electrochemical sensors in which ion-selective electrodes or glass electrodes are used are amperometric or voltammetric sensors.

Ion-selective glass electrodes are distinguished by good measuring properties, in the case of a pH glass electrode this relates, for example, to the gradient, the long-term stability, the selectivity and the detection limit. However, the wall thickness of the high-impedance glass membranes is typically chosen to be very thin, and therefore has only low mechanical stability.

The ion-selective electrodes with solid contact, also referred to as solid state electrodes, represent an alternative. These include, for example, enamel electrodes, such as are described in the unexamined patent application DE 2721939 A1 or in the examined and published application DE 2133419. These electrodes generally have a metallic base body onto which an ion-selective or, in the special case of the hydronium ions, a pH-sensitive glass layer is applied. The ion-selective layer can be an enamel coating. According to the definitions/labeling standards, RAL registration RAL-RG 529 A2 from July 2007 by RAL Deutsches Institut für Gütesicherung and Kennzeichnung e.V., a vitreous material that is produced by completely or partially melting substantially oxidic raw materials is referred to as an enamel. The inorganic preparation thus produced is applied with additives in one or more layers to workpieces made of metal or glass and fused at temperatures above 480° C. Base constituents of (ion-selective) enamel layers are, for example, one or more of the oxides silicon oxide, sodium oxide, potassium oxide, calcium oxide, magnesium oxide and aluminum oxide. An ion-selective glass, for example pH glass, applied to a metallic base body using such a method is therefore also referred to hereafter as an ion-selective enamel layer or, in the case of an enamel layer specifically selective for hydronium ions, as a pH enamel layer, and a corresponding electrode is referred to as an enamel electrode.

Such enamel electrodes are distinguished by high mechanical stability and can be configured to be easy to clean by providing an enamel coating covering all parts of the probe coming into contact with the process. They can therefore be used in processes of the food industry and in chemical processes in which frequent cleaning has to be carried out.

The measuring probe described in DE 2133419 for determining an ion concentration in liquids comprises a measuring half-cell including an ion-sensitive glass enamel layer applied to a metallic carrier. Either the metallic carrier itself or an electrical conductor embedded in an enamel layer, which is arranged between the cover enamel layer and the carrier and is in contact with the glass enamel layer, can serve as a lead for the potential arising at the ion-sensitive layer. In one of the embodiments of the measuring probe described in DE 2133419, a conventional reference electrode remote from the measuring half-cell is used as the reference half-cell. In another embodiment, a second half-cell including a second ion-sensitive glass enamel layer is used as a reference half-cell. In this embodiment, the pH measurement thus takes place as a difference pH measurement. The measuring half-cell is formed by an outer steel body that includes the first glass enamel layer applied to the outside and surrounds an inner steel body, so that an intermediate space for receiving reference liquid is created between the steel bodies. The inner steel body is mushroom-shaped at the lower end, so that a ground-joint diaphragm can be provided between the adjoining surfaces of the two steel bodies via which the reference liquid can be brought in contact with a measuring liquid. A second ion-sensitive glass enamel layer arranged on the surface of the inner steel body is in contact with the reference liquid. To ascertain the ion concentration, a voltage is measured between the two glass enamel layers, which are each contacted by way of a potential lead. DE 2133419 does not clarify how the electrodes formed by the enameled steel bodies can be integrated into a housing to form a measuring probe suitable for use in process metrology.

A potentiometric measuring probe for determining the ion concentration in liquids, which comprises a tubular steel body, is known from DE 27 21 939 A1. The steel body is enameled on the outside and in this region carries an ion-selective enameled measuring electrode, which forms the measuring half-cell of the potentiometric measuring probe. A hollow cylindrical body, which is coaxially surrounded by the steel body and contains a reference electrode system comprising a reference electrolyte, is inserted into the steel body. This system is in contact with a measuring medium by way of a diaphragm integrated into the hollow cylindrical body. The reference half-cell thus formed and the measuring half-cell can be electrically contacted by a sensor circuit. The steel body of the measuring probe described in DE 27 21 939 A1 not only serves as a carrier for the measuring electrode, but at the same time forms the outer housing of the measuring probe. At the rear end remote from the measuring medium, it is covered with a covering sleeve and an end cap, which are sealed by O-rings.

SUMMARY

The object of the present disclosure is to provide an ion-selective electrode comprising a sensor element that has an ion-selective coating, and can be connected to a probe housing made of another material in a simple manner and via a stable and easy-to-clean connection.

This object is achieved by an ion-selective electrode and an electrochemical sensor to claim 11. Some embodiments are listed in the dependent claims.

The ion-selective electrode according to the present disclosure for an electrochemical sensor for determining a measurand representing a concentration of an analyte in a measuring medium comprises includes a probe body made of a first material, and a sensor element comprising a base body of a second material different from the first material and an ion-selective layer arranged on the base body. The probe body is connected to the base body by way of a liquid-tight joint, where the joint is formed by a receptacle, serving as a first joining partner, and a joining section protruding into the receptacle, serving as a second joining partner.

This design of the joint ensures a stable connection of the base body to the probe body. The joint can be configured to be hygienic and easy to clean by means of an adhesive joint in which an adhesive fills gaps arranged between the joining partners.

The joining section can, for example, comprise at least one surface region that is joined to a surface of the receptacle by way of an adhesive layer, and wherein the joining section is held in the receptacle by form fit in a perpendicular direction to the adhesive layer. The receptacle can, for example, have a rectangular cross-section delimited by a bottom and two side walls. In this case, the adhesive layer can connect the surface region of the joining section to one or both of the side walls of the receptacle extending perpendicularly to the bottom of the receptacle, wherein the respective side wall, which is arranged at a distance, holds the joining section in the receptacle in a form-locked manner in a direction perpendicular to the adhesive layer.

This design of the joint also ensures a stable connection of the base body to the probe body during regularly occurring temperature fluctuations, even if the first material and the second material exhibit significantly different thermal expansion behaviors. The development of forces on the adhesive joint, and the attendant formation of cracks, is suppressed or even avoided in that the form fit prevents the two joining partners, which expand to different degrees, from moving with respect to one another, so that the joint remains stable even with regularly occurring temperature fluctuations. This allows the sensor element to be fastened to a probe housing made of another material by way of an adhesive joint in a hygienic design, which also withstands regular cleaning and sterilization.

The receptacle can be formed in the probe body or in the base body. Accordingly, the joining section can be part of the corresponding mating part. If the receptacle is formed in the probe body, the joining section is therefore part of the base body. If the receptacle is formed in the base body, the joining section is part of the probe body.

The ion-selective layer can, for example, be an ion-selective enamel layer, such as, a pH enamel layer.

The receptacle can be designed as a groove. The groove can have a groove base and two side walls, the distance between them defining the width of the groove. It can, for example, have a rectangular or trapezoidal cross-section. The groove can be closed, for example in the form of an annular groove having a circular, elliptical or asymmetrical ring cross-section.

The joining section can be shaped in a manner corresponding to the shape of the groove so as to engage the groove and be held in a form-locked manner between the side walls in a direction perpendicular to the side walls. For this purpose, the joining section can have two surfaces facing away from one another, hereafter referred to as a first surface and a second surface. If the groove is closed, for example annular, the joining section can have a tubular, for example hollow-cylindrical, design in the region thereof protruding into the receptacle. The tube cross-section of the joining section can be circular, elliptical or asymmetric. In all these embodiments, the first surface forms an inner surface of the joining section, and the second surface facing away from the inner surface forms an outer surface of the joining section. The two surfaces, for example the inner surface and the outer surface, can be joined to one another with the side walls of the groove at least in sub-regions by an adhesive layer formed of an adhesive. For example, the adhesive can completely or even only partially fill gaps arranged between a first side wall of the groove and the inner surface of the joining section, and between a second side wall of the groove and the outer surface of the joining section, and thus form the adhesive layer mentioned above.

In at least one sub-region of the joint, the first side wall and a first of the two surfaces, and the second side wall and the second of the two surfaces, can rest against one another directly, that is, without an adhesive layer arranged therebetween. The sub-regions of the joints joined to one another by an adhesive layer are thus arranged at a distance from one another.

The receptacle and the joining section can have a shared axis of cylindrical symmetry or rotational symmetry or, in general terms, a shared longitudinal axis. In this embodiment, the joining section can be held in the receptacle in such a way that form fit exists in all directions of a plane perpendicular to the axis of cylindrical symmetry or to the axis of rotational symmetry or to the longitudinal axis.

An inner edge between a surface including the receptacle and the joining section can be covered by a polymer coating. The polymer coating can be configured as an adhesive bead. On the one hand, it can act as a seal for the gap between the receptacle and the joining section, and on the other hand, by covering the inner edge, it can create a rounded transition between the surface containing the receptacle and the joining section, which can be reliably hygienically cleaned. The rounded transition can be configured, for example, in a concavely rounded manner.

The base body can comprise a metal or a metal alloy or a ceramic. In addition to the ion-selective layer, it can comprise further layers, for example made of an insulating enamel. The base body includes at least one region formed of an electrically conducting material, for example metal or a metal alloy, electrically conducting ceramic or an electrically conducting polymer, which electrically contacts the ion-selective layer on the side thereof facing the base body and serves as a potential lead of the electrode. This region can be formed by the base body itself, which is formed of an electrically conductive material (metal, metal alloy, electrically conductive ceramic) or by an electrically conductive layer applied to the base body.

The probe body can be formed of glass or of a polymer, for example PVDF or PEEK or another hygiene-certified polymer.

The probe body can be rod-shaped or tubular, wherein the cross-section thereof can be circular, but need not necessarily be circular. For example, it is also possible for the cross-section of the probe body to have an asymmetrical, flow-optimized shape.

If the probe body includes the receptacle, it can be configured in the following way: The receptacle, for example the aforementioned groove, can be arranged at an end face of the probe body in such a way that the receptacle or groove cross-section extends from an end-face surface of the probe body into the probe body. If the probe body is tubular, the end-face surface is, for example, an annular surface.

If the probe body includes the joining section, it can be configured in the following way: The joining section can be a section that extends in the longitudinal direction of the probe body and adjoins an end-face surface, which, for example, can be a circular, elliptical or annular surface or an asymmetrical, for example flow-optimized, surface. The joining section can also be a projection extending in the longitudinal direction of the probe body at the end-face surface, for example in the form of a ring placed onto the surface or one or more pins placed onto the surface.

The base body can be configured as a cap that is closed on one side, having the receptacle or the joining section arranged at the open end thereof. The ion-selective layer can be arranged at the closed end of the base body and/or along an outer circumferential surface of the base body.

If the base body includes the receptacle in this embodiment, it can be configured in the following way: The receptacle, for example the aforementioned groove, can be arranged at an end face at the open end of the base body in such a way that the receptacle or groove cross-section extends into the base body from the end-face surface of the base body, which can be an annular surface, for example.

In this embodiment, the base body includes the joining section and can be configured in the following way: The joining section can be a section that extends in the longitudinal direction of the base body to the closed end and adjoins an end-face surface at the open end of the base body. The joining section can also be a projection extending in the longitudinal direction of the base body away from the closed end on the end-face surface, for example in the form of a ring placed onto the surface or one or more pins placed onto the surface.

The present disclosure also includes an electrochemical, such as, potentiometric, sensor for determining a measurand representing a concentration of an analyte in a measuring medium, including an ion-selective electrode serving as a measuring-half-cell of the potentiometric sensor. The electrochemical sensor, such as a potentiometric sensor, includes a reference half-cell and a sensor circuit that is connected to the reference half-cell and the measuring half-cell in an electrically conducting manner. The measurand can, for example, be a pH value or an ion concentration in a measuring liquid.

The sensor circuit is configured to detect measured values of the measurand. If the sensor is a potentiometric sensor, the sensor circuit is configured to measure a voltage between the measuring half-cell and the reference half-cell. According to the principle of potentiometric sensors described at the outset, this voltage is representative of an ion concentration or a pH value of a measuring liquid making contact with the measuring and reference half-cells.

As described above, the base body can be configured as a cap that is closed on one side, having the open end thereof joined to the probe body by way of the joint.

A cavity can be formed in the probe body in which a reference electrolyte and a reference element contacting the reference electrolyte are arranged, a diaphragm being arranged in a wall of the probe body by way of which the reference electrolyte is in electrolytic contact with a medium surrounding the probe body. In this embodiment, the electrochemical sensor is configured as a measuring probe, in which the measuring and reference half-cells and, if necessary, further sensor components are combined, for example as a potentiometric single-rod measuring chain. The sensor circuit can likewise be accommodated at least partially in the measuring probe, that is, in a probe housing comprising the probe body. According to this embodiment, on the one hand, the connection between the base body and the probe body can be configured, as described above, such that it can be hygienically cleaned and is not sensitive to temperature fluctuations. On the other hand, the reference half-cell is also integrated into the probe body, so that overall a measuring probe results that is configured such that it can be hygienically cleaned and includes a sensor element configured as an ion-selective enamel electrode.

The probe body can be formed of glass or of plastic. The diaphragm can be connected to the wall by fusion (glass) or insert molding (plastic). This type of integration of the diaphragm into the wall of the probe body may be favorable with respect to a hygienically cleanable joint between the diaphragm and the probe body.

The diaphragm can be formed of a ceramic, for example a zirconium oxide-based ceramic, which includes a plurality of pores for producing an electrolytic contact between a measuring liquid and the electrolyte. For the use of the sensor in processes or systems that have special hygiene requirements, the average pore diameter may be especa few 100 nm, for example values less than or equal to 200 nm. For example, for applications in hygienically demanding processes, the average pore diameter can be in a range between 100 and 200 nm.

The base body can include at least one region serving as a potential lead of the measuring half-cell, which is formed of metal or a metal alloy, an electrically conducting ceramic or an electrically conductive polymer, which electrically contacts the ion-selective layer on the side thereof facing the base body and is electrically insulated with respect to the reference electrolyte and the reference element of the reference half-cell. In a first possible embodiment, the base body can be formed completely of the electrically conducting material and itself serve as a lead. In a second possible embodiment, the base body can include a coating, comprising an electrically conducting layer that electrically contacts the ion-selective layer on the side thereof facing the base body. The potential lead of the measuring half-cell and the reference element are connected to the sensor circuit in an electrically conducting manner.

The measuring half-cell can comprise a pre-amplifier and/or impedance converter connecting the potential lead to a high-impedance input of the sensor circuit. The pre-amplifier or impedance converter can be arranged in a cavity enclosed by the base body of the measuring half-cell. An input of the pre-amplifier or impedance converter can be connected to the potential lead, and a second input can be at the potential of a shield of the measuring half-cell. The electrically conductive connection of the input of the pre-amplifier to the potential lead can be effected in the conventional manner by a soldered connection, but also by a conductive intermediate layer or conductive fibers, a conductive nonwoven, a conductive felt or conductive wool, for example made of a carbon-based material. The signal-to-noise ratio of the measurement signal of the electrochemical sensor can be increased by means of the pre-amplifier.

A temperature sensor can be integrated into the base body. For example, the temperature sensor can be arranged in a cavity formed inside the base body, wherein the temperature sensor is in thermally conducting contact with the base body, such as, by way of a thermally conducting connecting layer.

The sensor circuit can be configured to ascertain a raw measured value of the measurand from a voltage detected between the potential lead of the measuring half-cell and the reference element, and to carry out a temperature compensation of the raw measured value based on a measurement signal of the temperature sensor.

The temperature compensation of the raw measured value is used to compensate for the temperature dependence of the slope of the potentiometric measuring chain formed of the measuring and reference half-cells.

The sensor circuit can be configured to convert analog measurement signals, for example an analog voltage detected between measuring and reference half-cells or an analog signal of the temperature sensor, into digital measurement signals. Furthermore, the sensor circuit can comprise an electronic circuit including one or more microprocessors configured to process the digitized measurement signals.

In order to carry out the temperature compensation, the sensor circuit can be configured to execute a computer program that is stored in a memory of the sensor circuit and used to ascertain temperature-compensated measured values. This computer program can include a base algorithm for temperature compensation of potentiometric raw measured values. In addition, the computer program can include an additional algorithm, which calculates input values for the base algorithm from the digitized temperature measurement signals provided by the temperature sensor. This modular structure of the computer program makes it possible to carry out the temperature compensation by means of a base method that can be used universally in different types of potentiometric sensors, for example based on the Nernst equation, and at the same time, by adapting the input values, to take specific temperature dependencies of the slope of different sensor types into account during the temperature compensation. A specific temperature dependence of a sensor type can result from special apparatus features. Thus, for example, potentiometric measuring chains including a half-cell that comprises a solid contact, such as the enamel electrode described here, have a stronger dependence of the measuring chain slope on the temperature than potentiometric pH measuring chains including a conventional glass electrode, which have a lead system composed of an internal electrolyte and an electrically conducting potential lead contacting the internal electrolyte.

If the sensor circuit is divided into a part located in the probe and a part remote from the probe, the part of the sensor circuit located in the probe can provide the input values ascertained from the raw measured values, while the base algorithm is carried out in the remote part. This allows the part remote from the probe to be combined with various other probes, without having to revise the base algorithm.

BRIEF DESCRIPTION OF THE DRAWINGS

The present disclosure is explained in further detail below on the basis of the exemplary embodiments shown in the figures. They show.

DETAILED DESCRIPTION

Figure 1:
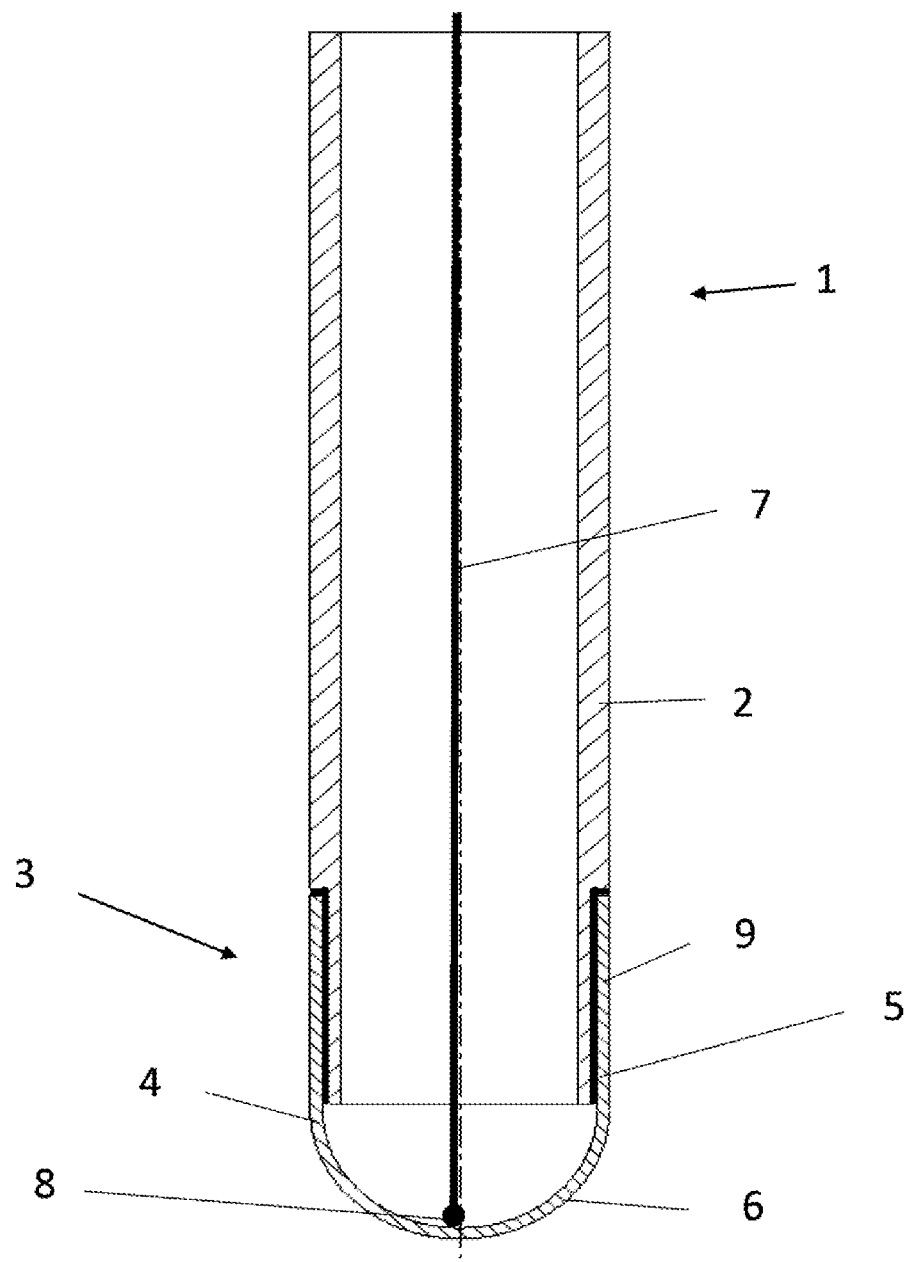
FIG. 1 is a schematic longitudinal sectional view of a first ion-selective electrode comprising a sensor element and a probe body, which are joined to one another by a joint.

FIG. 1 schematically shows a longitudinal section through an ion-selective electrode 1. It comprises a probe body 2 and a sensor element 4 joined to the probe body 2 by way of a joint 3. In the example shown here, the tubular probe body 2 is composed of a polymer, for example PEEK or PVDF. The wall thickness of the tubular probe body 2 is reduced in the region of the joint 3 in such a way that the outside diameter of the probe body 2 decreases abruptly, forming a stop surface pointing towards the sensor element 4.

The sensor element 4 is only hinted at here. It has a tubular base body 5 that is open on one side and has a dome-shaped surface at the closed end thereof. In the present example, the base body 5 is composed of a metal alloy, for example of a steel. An ion-selective glass coating 6, for example made of a pH enamel layer, is applied to the dome-shaped outer-side surface. The outer-side surface regions of the base body 5 not covered by the pH glass are covered and electrically insulated by an insulating enamel coating composed of one or more layers.

In the example shown here, the base body 5 thus forms a potential lead for a potential forming at the ion-selective layer 6. The base body 5 can be connected to the input of a sensor circuit of an electrochemical sensor in an electrically conducting manner via a contact point 8 and an electrical conductor 7.

At the joint 3, the base body 5 is placed on the section of the probe body 2 having a reduced outside diameter. The inside diameter of the base body 5 is dimensioned in such a way that an inwardly pointing circumferential surface of the open end section of the base body 5 rests against the outer circumferential surface of the probe body 2. The end-face surface at the open end of the base body 4 strikes against the stop surface formed in the probe body 2. The gap between the base body 4 and the probe body 2 is filled with an adhesive 9, which fixedly joins the probe body 2 and the base body 5 to one another.

Although this type of joint between the probe body 2 and the base body 5 basically satisfies the purpose of a use in measurement environments with high hygiene requirements, since the contact point is completely filled by the adhesive 9, it is extremely difficult to achieve a tight and permanently stable joint in this way if the materials of which the base body 5 and the probe body 2 are formed have drastically different coefficients of thermal expansion. If the probe body 2 and the base body expand to different degrees, the two joining partners move with respect to one another at the joint 3. The forces arising in the process are absorbed by the joining adhesive layer 9.

An adhesive having a high modulus of elasticity achieves a very good bond strength, but can develop cracks in the event of temperature fluctuations. Since the entire mechanical load caused by the opposing movements of the joining partners has to be absorbed by the adhesive, it is even possible for the adhesive joint to detach when the temperature load is too high. The formation of cracks jeopardizes hygiene, and separation of the adhesive joint can lead to functional failure.

Although an adhesive having a low modulus of elasticity is more flexible and less vulnerable to cracking or detachment, it does not achieve the required bond strength. In addition, many adhesives having a low modulus of elasticity allow the diffusion of moisture into the interior of the electrode 1, and thus likewise jeopardize the function of the electrode 1.

Figure 2:
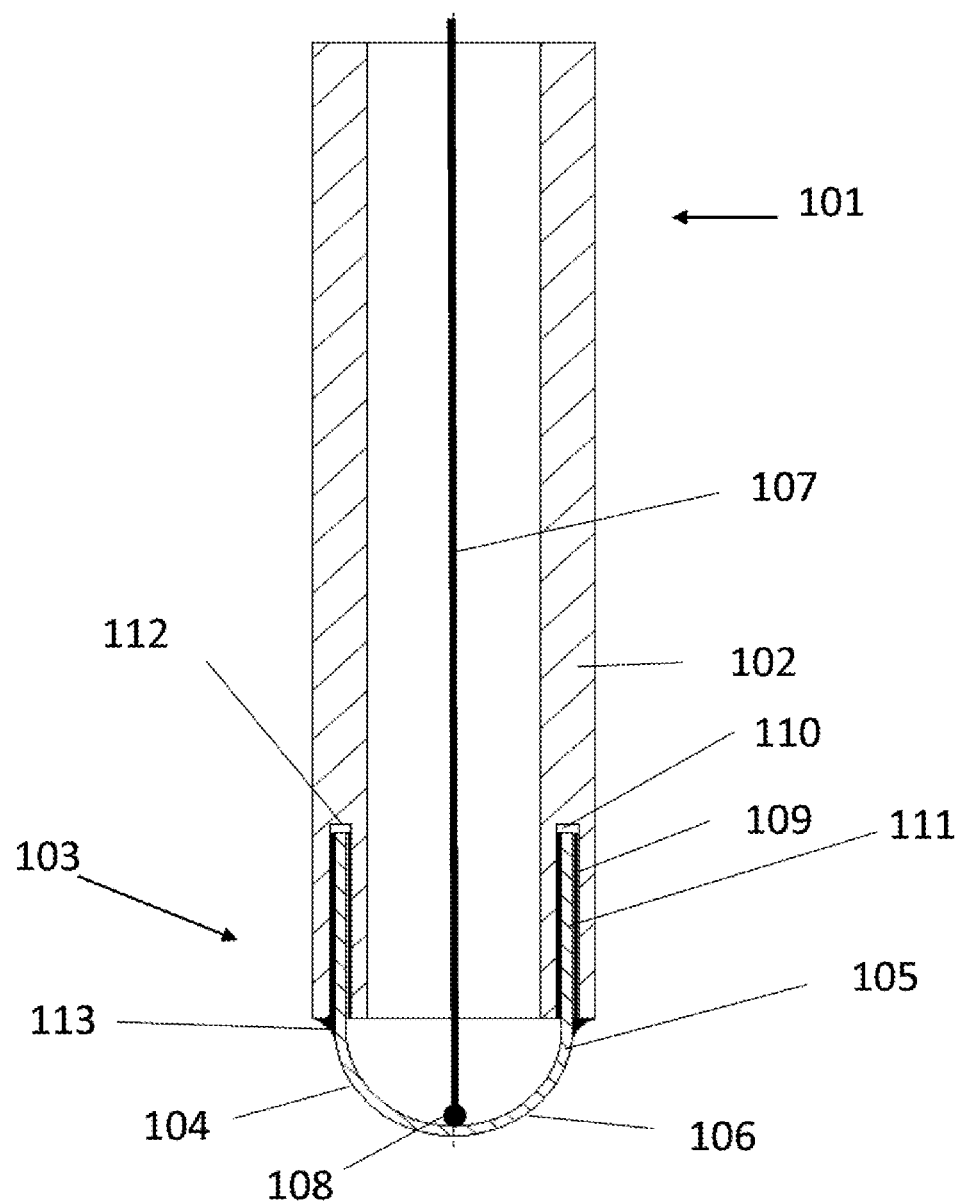
FIG. 2 is a schematic longitudinal sectional view of a second ion-selective electrode comprising a sensor element and a probe body, which are joined to one another by a joint.

A permanently durable, tight joint satisfying hygiene requirements is achieved in the ion-selective electrode 101 shown in FIG. 2. Like the ion-selective electrode 1 shown in FIG. 1, it comprises a probe body 102, which in the present example is composed of a polymer, and a sensor element 104 connected to the probe body 102. The sensor element 104 comprises a base body 105 made of an electrically conducting material, for example stainless steel, and an ion-selective enamel layer 106, which is arranged on the base body 105 and is contacted at the rear by the base body 105 and which comprises an ion-selective glass, for example Na glass or pH glass. The base body 105 is contacted at the rear by a contact point 108 and an electrical conductor 107. The electrical conductor 107 can be connected to a sensor circuit. As in the example shown in FIG. 1, the base body 105 is designed as a cap comprising a tubular housing that is open on one side and closed at the end thereof located opposite the open end by a dome-shaped surface. The ion-selective layer 106 can be arranged on the dome-shaped surface and/or along the circumference of the cap. The outer-side surface regions of the base body 105 not covered by the ion-selective layer 106 are covered and electrically insulated by an insulating enamel coating.

The ion-selective electrode 101 shown in FIG. 2 differs from the ion-selective electrode 1 shown in FIG. 1 by the design of the joint 103 between the probe body 102 and the base body 105. The probe body 102 is tubular and has an end-face, annular surface at the end thereof facing the sensor element 104. A receptacle in the form of a circumferential, likewise annular, groove 110 is arranged in this surface, into which a section of the open end of the base body 105 serving as a joining section 111 projects. An outer circumferential surface of the joining section 111 (also referred to as an outer surface of the joining section 111) rests against a first side wall of the groove 110, and an inner circumferential surface of the joining section 111 (also referred to as an inner surface) facing away from the outer circumferential surface of the joining section 111 rests against a second side wall of the groove 110. The first side wall of the groove 110 and the outer circumferential surface are joined by way of an adhesive layer 109, and the second side wall of the groove 110 and the inner circumferential surface are likewise joined by way of a further adhesive layer 109. Both the gap between the outer circumferential surface and the first side wall, and the gap between the inner circumferential surface and the second side wall, are completely filled with the adhesive. The adhesive has a high modulus of elasticity and does not allow moisture to diffuse into the gaps. In this way, good sealing of the electrode interior is achieved by the joint 103.

Even though, in the case of temperature fluctuations, the two joining components also expand to differing degrees in the exemplary embodiment shown here, the form fit in all directions perpendicular to the annular adhesive layers 109, or perpendicular to the side walls of the groove 110 (here also: parallel to the groove base 112), does not allow the joining partners to move with respect to one another. The forces arising due to the differing thermal expansion of the probe body 102 and the base body 105 are thus absorbed by the joining partners themselves, but not by the adhesive layers 109. Thus, cracking or detachment of the adhesive layers 109 is avoided or at least greatly reduced.

In the example shown here, the groove 110 serving as a receptacle and the tubular joining section 111 have a shared (imaginary) axis of cylindrical symmetry or rotational symmetry. The form fit here exists in all directions of a plane perpendicular to the axis of cylindrical symmetry axis or to the axis of rotational symmetry, and thus also perpendicular to the adhesive layers 109 or the side walls of the groove 110.

To ensure the hygiene requirements, such as gap clearance and cleanability, the gap formed between the outer circumferential surface of the joining section 111 and the first side wall of the groove 110 is covered with a circumferential bead 113 made of a adhesive suitable for hygienic use. This bead is designed so as to seal, in a manner suitable for hygienic use, the inner edge formed between the end-face surface of the sensor body 102 and the adjoining surface of the base body 105. This is ensured by virtue of the fact that the adhesive bead 113 creates a continuous, rounded transition between the two surface regions by wetting the surface regions of the joining partners adjacent to the inner edge. As shown in FIG. 2 the transition can be configured to be concavely rounded, for example. While the inner edge cannot be reliably hygienically cleaned without the adhesive bead, hygienic cleaning of the rounded transition formed by the adhesive bead 113 is possible without difficulty.

This design of the joint 103 ensures a stable, tight design of the ion-selective electrode 101 which is suitable for use in processes with high hygiene requirements.

Figure 3:
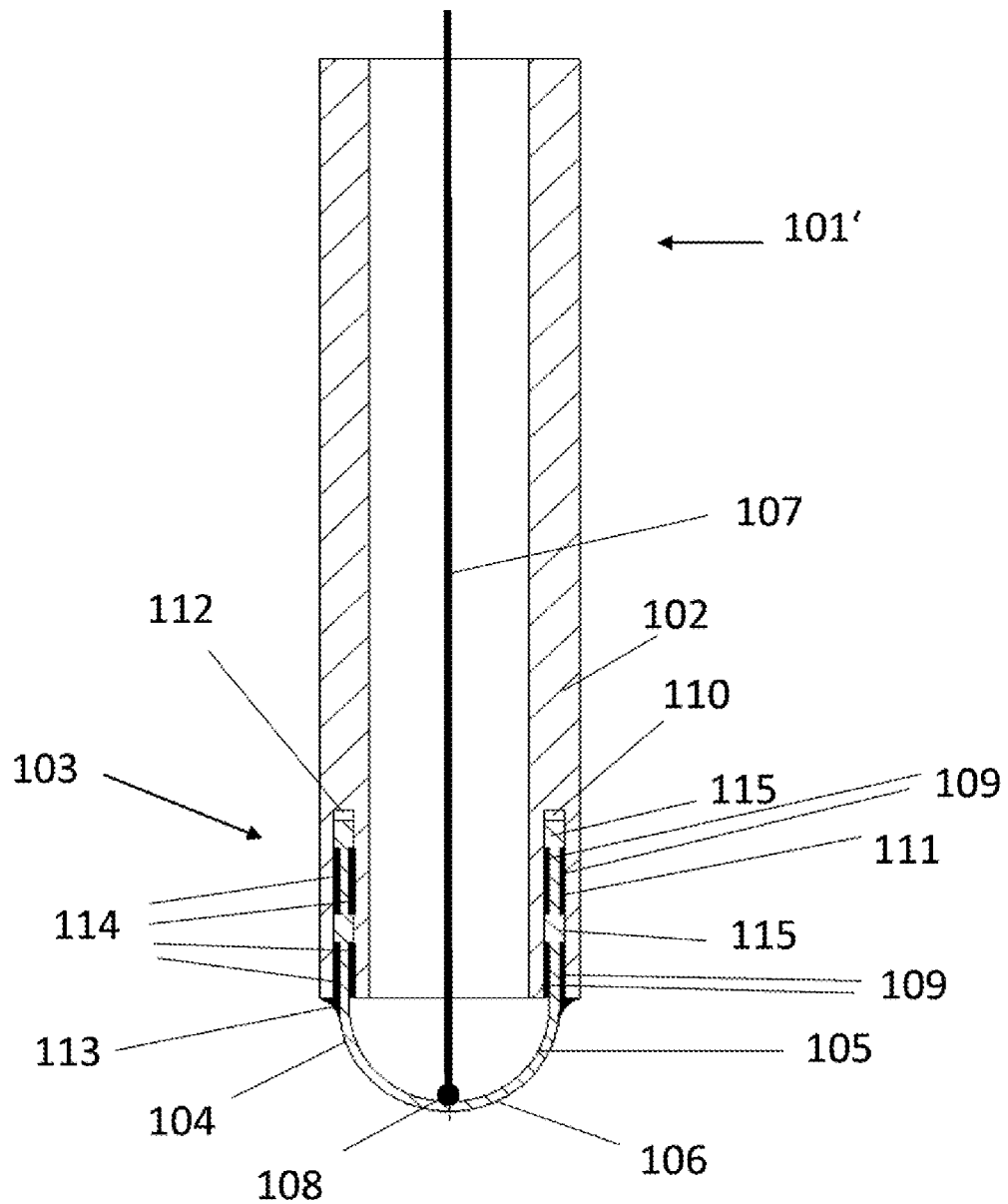
FIG. 3 is a schematic longitudinal sectional view of a third ion-selective electrode comprising a sensor element and a probe body, which are joined to one another by a joint.

FIG. 3 schematically shows the ion-selective electrode 101' in a modification. Elements of the electrode 101 according to FIG. 2 and of the modified ion-selective electrode 101 according to FIG. 3 denoted by the same reference numerals are identically configured.

A plurality of adhesive gaps 114 that are spaced apart from one another in the longitudinal direction of the probe body 102 are arranged at the joint 103 and are formed here by a wall thickness taper on both sides in the joining section 111 of the base body 105. The wall thickness taper is created in each case by a circumferential recess in the inner surface and an opposite recess in the outer surface of the joining section 111. The adhesive gaps 114 are each filled with an adhesive layer 109. Regions 115 in which there is direct contact between the side walls of the groove 110 and the joining section 111, that is, in which the probe body 102 and the base body 105 rest directly against one another, are arranged between the adhesive gaps 114. In this embodiment, the load on the individual adhesive layers 109 during temperature fluctuations is further reduced.

Figure 4:
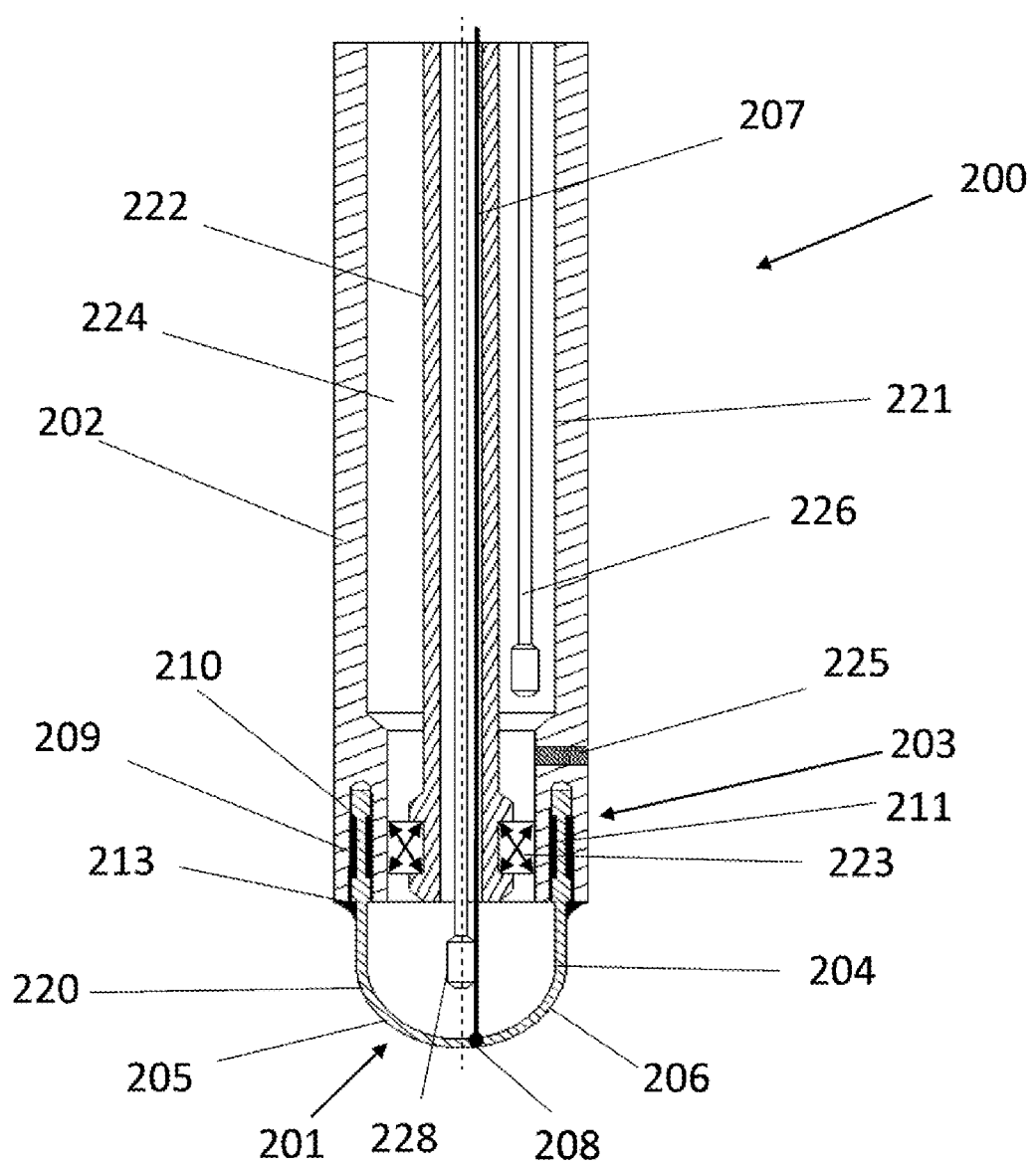
FIG. 4 is a schematic longitudinal sectional view of a potentiometric probe comprising a measuring half-cell and a reference half-cell.

FIG. 4 shows a schematic longitudinal sectional view of a potentiometric single-rod measuring chain comprising an ion-selective enamel electrode 201, serving as a measuring half-cell 220, and a silver/silver chloride reference half-cell 221, which is configured as a measuring probe 200 that can be immersed in a measuring liquid. The ion-selective electrode 201 is designed analogously to the ion-selective electrodes 101, 101' described based on FIGS. 2 and 3. The measuring probe 200 comprises a substantially tubular probe body 202, in which both the measuring half-cell 220 and the reference half-cell 221 are formed. The probe housing of the measuring probe 200 furthermore comprises an inner tube 222 coaxially arranged in the probe body 202. The probe housing, such as, the inner tube 222 and the probe body 202, can be made of a polymer suitable for hygiene purposes, such as PVDF, PEEK, or the like. An annular sealing member 223 is arranged in a front end section of the probe housing, which seals the front side of an annular reference half-cell space 224 arranged between the inner tube 222 and the inner wall of the tubular probe body 202. The terms "front side" or "front-side" here and hereafter denote the end region of the measuring probe or of the probe housing which is intended for immersion in a measuring liquid for detecting measured values. "Rear side" or "rear-side" denotes the end opposite the front-side region, which can be intended for connecting the measuring probe to a sensor circuit or a higher-level electronics unit, and which generally is not immersed into the measuring liquid.

On the rear side, the reference half-cell space 224 is sealed by a further seal (not shown in FIG. 4). A reference electrolyte, which can comprise a highly concentrated KCl solution, is accommodated in the reference half-cell space 224. The reference electrolyte can be an aqueous liquid, which can optionally be thickened by addition of a polymer. A porous ceramic diaphragm 225 is arranged in the wall of the probe body 202 and establishes electrolytic contact between the reference electrolyte and the measuring medium surrounding the probe body 202. A reference element 226, which electrically contacts the reference electrolyte and which is led out of the reference half-cell space 224 and connected to a sensor circuit (not shown) in an electrically conducting manner, extends into the reference half-cell space 224. The reference element 226 can be configured as a chlorided silver wire, for example, at least in sections.

A sensor element 204 is joined to the probe body 202 at the front-side end of the probe body 202 by way of a joint 203, which is configured substantially analogously to the joint 103 of the ion-selective electrode 101 or 101' described above with reference to FIGS. 2 and 3. The sensor element 204 comprises a base body 205 made of an electrically conducting metal or a metal alloy or an electrically conducting ceramic and comprises a layer 206 made of a pH-sensitive glass, for example a pH enamel layer. The remaining surface regions not covered by the pH enamel layer are covered and insulated by an insulating enamel coating.

A receptacle in the form of a circumferential annular groove 210 is arranged in the front-side annular end face of the probe body 202, into which a section of the open end of the base body 205 serving as a joining section 211 projects. A first side wall of the groove 210 and the outer circumferential surface of the joining section 211 are joined by way of an adhesive layer 209, and the second side wall of the groove 210 and the inner circumferential surface of the joining section 211 are likewise joined by way of a further adhesive layer 209. The adhesive layer 209 is formed by filling a gap arranged between the surfaces with adhesive. These adhesive layers 209, as previously described, effect stable and durable bond strength between the sensor element 204 and the probe body 202. Sections of the side walls of the groove 210 and of the joining section 211 are also arranged in the region of the joint 203, which rest against one another directly, that is, without an adhesive layer. The inner edge between the outer surface of the base body 205 and the end face of the sensor body 202 is covered by a circumferential adhesive bead 213 made of an adhesive suitable for hygienic use. As previously described, the adhesive bead 213 creates a continuous, rounded transition between the outer surface of the base body 205 and the end face of the probe body 202, which can be hygienically cleaned well.

The electrically conducting base body 2054 forms a potential lead of the measuring half-cell 220, via which a potential arising at the ion-selective layer 206 is discharged. In the present example, the base body 2045 can be connected to the sensor circuit by an electrical conductor 207, for example a cable or a conductor track, which electrically contacts the base body 2045 at a contact point 208. The electrical conductor 207 is guided through the inner tube 222 in the present example.

In the measuring mode, the measuring probe 200 is immersed in a measuring liquid in the front-side immersion region thereof, which comprises the sensor element 204 and the diaphragm 225. The sensor circuit is configured to detect pH measured values by measuring a voltage between the potential lead of the measuring half-cell 220 and the reference element 226. The sensor circuit has a high-impedance input at least for the potential lead of the measuring half-cell 220. The reference half-cell 221 that is arranged around the inner tube 222 and includes the liquid reference electrolyte, which is electrically connected to the measuring liquid by way of the diaphragm 225, which may serve as an electrical shield for the electrical conductor 207, and thus for the measurement signal of the measuring half-cell 220, in the arrangement shown in FIG. 4. To further improve the signal quality, the measuring half-cell 220 can comprise a pre-amplifier connecting the potential lead to a high-impedance input of the sensor circuit. The pre-amplifier can also be arranged in the cavity enclosed by the base body 2045 between the contact point 208 and the electrical conductor 207 (not shown in FIG. 4).

A temperature sensor 228 can be arranged in the cavity that is formed within the base body 204 and separated from the reference half-cell space by the seal 223. It is in thermally conductive contact with a side of the base body 205 facing away from the ion-selective layer 206 to detect measured values of the temperature of the sensor element 204. The temperature sensor is also connected to the sensor circuit in an electrically conducting manner. The measured temperature values can be used by the sensor circuit to carry out a temperature compensation of the raw measured values of the voltage detected between the reference element 226 and the potential lead of the measuring half-cell 220.

The invention claimed is:

1. An ion-selective electrode for an electrochemical sensor for determining a measurand representing a concentration of an analyte in a measuring medium, including:
   a probe body made of a first material; and
   a sensor element comprising a base body made of a second material different from the first material and an ion-selective layer arranged on the base body;
   the probe body being connected to the base body by way of a liquid-tight joint,
   and the joint being formed by a receptacle, serving as a first joining partner, and a joining section protruding into the receptacle, serving as a second joining partner, and
   wherein the base body includes at least one region formed of an electrically conductive material, which electrically contacts the ion-selective layer on the side thereof facing the base body an serves as a potential lead of the electrode.

2. The ion-selective electrode of claim 1,
   wherein the joining section comprises at least one surface region that is joined to a surface of the receptacle by way of an adhesive layer, and the joining section is held in the receptacle by form fit in a perpendicular direction to the adhesive layer.

3. The ion-selective electrode of claim 1,
   wherein the receptacle is a groove.

4. The ion-selective electrode according to claim 3,
   wherein the joining section is tubular at least in a region thereof projecting into the receptacle.

5. The ion-selective electrode of claim 1,
   wherein the joining section includes a first surface and a second surface facing away from the first surface, and the receptacle includes a first side wall and a second side wall, and the first surface and the first side wall, as well as the second surface and the second side wall, are joined to one another at least in sub-regions by an adhesive layer.

6. The ion-selective electrode of claim 5,
   wherein the first side wall and the first surface, and the second side wall and the second surface, rest directly against one another in at least one sub-region of the joint.

7. The ion-selective electrode of claim 1,
   wherein an inner edge between a surface including the receptacle and the joining section is covered by a polymer coating.

8. The ion-selective electrode of claim 1,
   wherein the base body includes a metal or a metal alloy, a polymer or a ceramic.

9. The ion-selective electrode of claim 1, wherein the base body is configured as a cap that is closed on one side having the receptacle or the joining section arranged at the open end thereof.

10. An electrochemical sensor for determining a measurand representing a concentration of an analyte in a measuring fluid, comprising:
    an ion-selective electrode serving as a measuring half-cell of a potentiometric sensor, wherein the ion-selective electrode includes: a probe body made of a first material; and a sensor element comprising a base body made of a second material different from the first material and an ion-selective layer arranged on the base body;
    the probe body being connected to the base body by way of a liquid-tight joint;
    and the joint being formed by a receptacle, serving as a first joining partner, and a joining section protruding into the receptacle, serving as a second joining partner, and wherein the base body includes at least one region made of an electrically conducting material, which serves as potential lead of the measuring half-cell and which electrically contacts the ion-selective layer on the side thereof facing the base body and is electrically insulated with respect to the reference electrolyte and the reference element of the reference half-cell;
    the electrochemical sensor further comprising: a reference half-cell; and
    a sensor circuit that is connected to the reference half-cell and the measuring half-cell in an electrically conducting manner.

11. The electrochemical sensor of claim 10,
    wherein the base body is configured as a cap that is closed on one side, having the open end thereof joined to the probe body by way of the joint.

12. The electrochemical sensor according to claim 10,
    wherein a cavity is formed in the probe body, in which a reference electrolyte and a reference element contacting the reference electrolyte are arranged, and a diaphragm is arranged in a wall of the probe body, by way of which the reference electrolyte is in electrolytic contact with a medium surrounding the probe body.

13. The electrochemical sensor of claim 12,
    wherein the diaphragm is connected to the wall by injection or insert molding.

14. The electrochemical sensor of claim 10, wherein the at least one region made of an electrically conducting material of the base body includes a metal or a metal alloy.

15. The electrochemical sensor of claim 10, wherein a temperature sensor is arranged in a cavity formed inside the base body, and the temperature sensor is in thermally conducting contact with the base body by way of a thermally conducting connecting layer.

* * * * *